July 30, 1935.  J. VAN VULPEN ET AL  2,009,823
TRAIN TEMPERATURE REGULATING SYSTEM
Filed Sept. 25, 1933  3 Sheets-Sheet 1
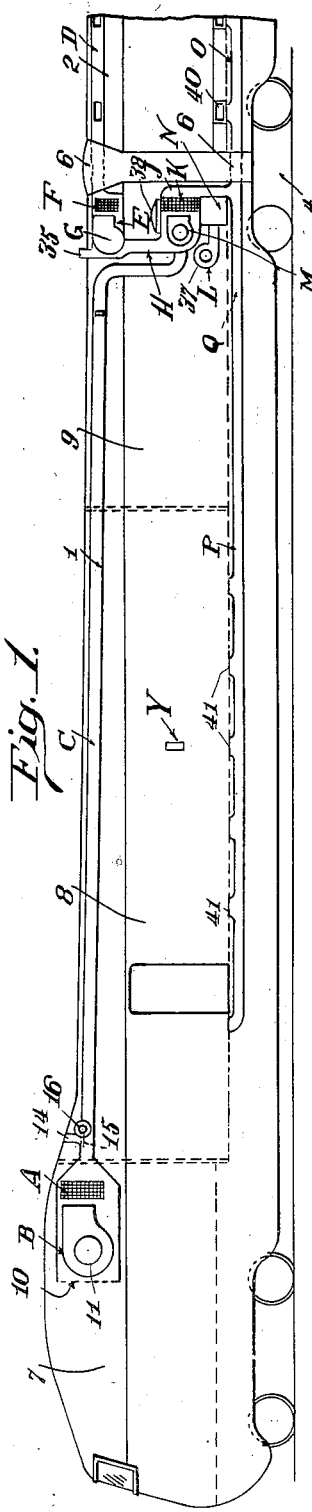
Inventors
John Van Vulpen
and Edward A. Russell
By Barnett & Truman
Attorneys.

July 30, 1935. J. VAN VULPEN ET AL 2,009,823
TRAIN TEMPERATURE REGULATING SYSTEM
Filed Sept. 25, 1933 3 Sheets-Sheet 2
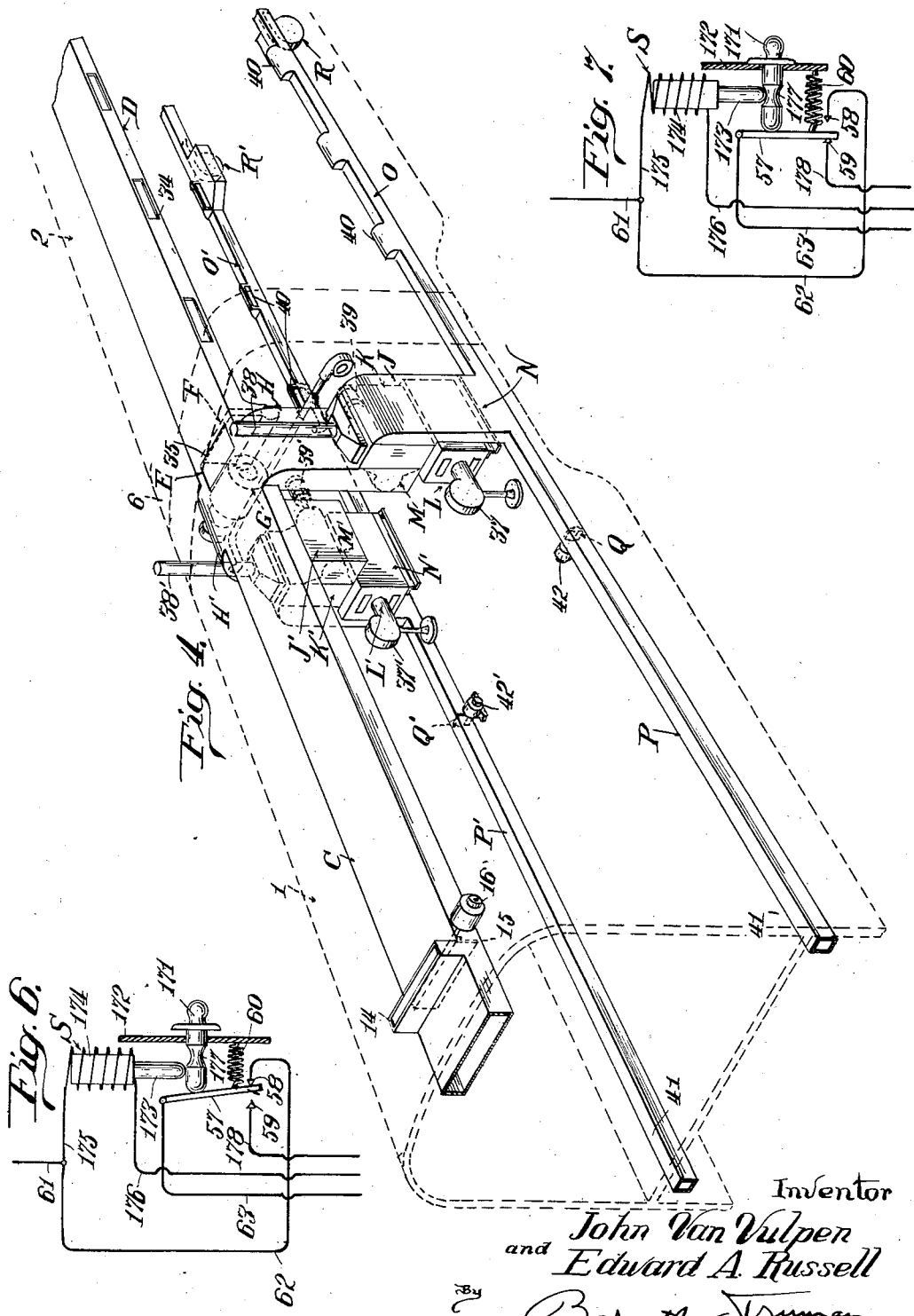
Inventor
John Van Vulpen
and Edward A. Russell
Attorneys.

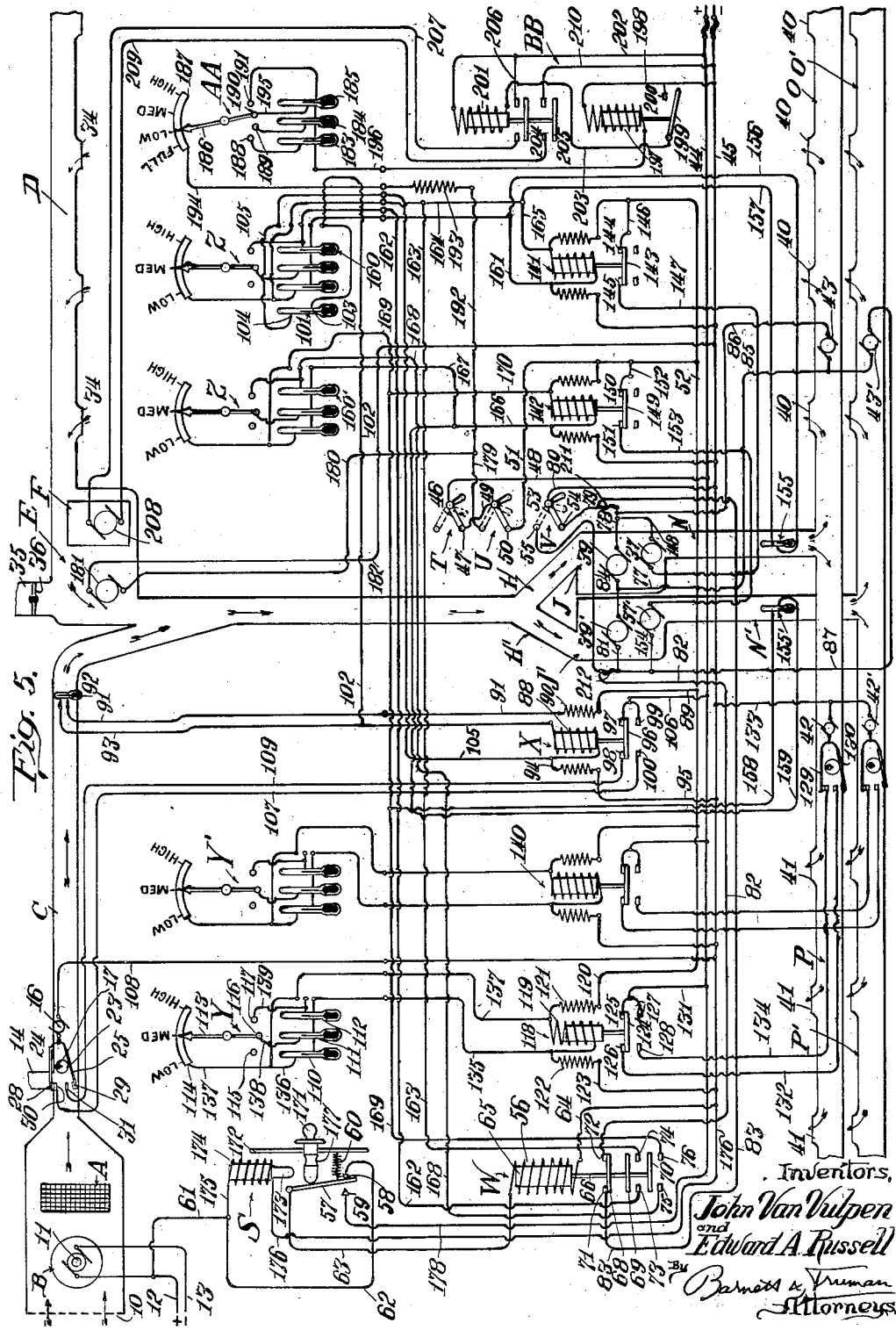

Patented July 30, 1935

2,009,823

UNITED STATES PATENT OFFICE 2,009,823

TRAIN TEMPERATURE REGULATING SYSTEM

John Van Vulpen and Edward A. Russell, Chicago, Ill., assignors to Vapor Car Heating Company, Inc., Chicago, Ill., a corporation of New York Application September 25, 1933, Serial No. 690,962

22 Claims. (Cl. 236—1)

This invention relates to certain new and useful improvements in a train temperature regulating system, and more particularly to an improved electrically actuated mechanism for automatically controlling the heat-supplying and heat-distributing devices so as to maintain selected temperatures in different portions of the spaces to be heated, and under various conditions, all as set forth more in detail hereinafter.

This invention has been designed more particularly for regulating the temperature in a train of the closed air-conditioned type, but it will be apparent as the disclosure proceeds that the greater portion of the temperature regulating system is equally applicable for use with apparatus for regulating the temperature in structures other than railway cars.

The invention is here shown by way of example in connection with the temperature regulating system for a train consisting of a plurality of articulated cars propelled by an engine of the internal combustion type. The train is provided with a blowing system for positively circulating air from and back into the cars. The fresh cool air which is used for withdrawing heat from the engine cooling apparatus is forced into the air-circulating system so as to add heat to the air within the cars. Auxiliary heaters are used for supplying additional heat to the circulating air when the heat furnished by the engine is insufficient for this purpose. Means is provided for diverting the engine heated air from the train and for controlling the auxiliary heaters so as to automatically maintain selected temperatures within the cars. A refrigerating apparatus is provided in connection with means for reversing the air circulation so as to cool instead of heat the air under summer temperature conditions. The regulating system comprises various manually operable selecting devices and automatic controls cooperating therewith so as to adapt the apparatus for use under different conditions of train movement, and different outside temperature conditions, all as disclosed more in detail hereinafter.

The principal object of this invention is to provide an automatic temperature regulating system of the type briefly described hereinabove and disclosed more in detail in the specifications which follow.

Another object is to provide a self-contained automatically controlled apparatus for circulating temperature-conditioned air within a railway train or other inclosure.

Another object is to provide a hot-air heating system utilizing air heated by the cooling system of an internal combustion engine in combination with auxiliary heaters for supplying additional heat to the circulating air as conditions require.

Another object is to provide a heating system including electrically actuated thermostatically controlled valves or vanes for controlling the flow of heated air through conduits.

Another object is to provide a system for circulating air within an enclosure in either direction through a system of conduits, in combination with means for heating the air when circulated in one direction and cooling the air when circulated in the other direction.

Another object is to provide a heating system including safety mechanism for cutting off the flow of air through a conduit when the temperature of the air therein exceeds a predetermined maximum.

Another object is to provide a heating system including safety mechanism for cutting off the supply of heat to a circulating air stream when the temperature of this air stream exceeds a predetermined maximum.

Another object is to provide a heating system including automatic control means for adjusting the system to maintain a predetermined minimum temperature whenever a main electrical actuating circuit is broken.

Another object is to provide a heating system comprising a plurality of normally simultaneously operating heating units together with means for automatically restricting the number of heating units left in service when a main electrically actuated circuit is broken.

Another object is to provide an improved electrically controlled selector relay for automatically adjusting the control mechanism when a main electrical actuating circuit is broken.

Another object is to provide improved means, in connection with a selector relay of the type above referred to, for permitting a manual selection of the temperature to be maintained when the main actuating circuit is broken.

Numerous other objects and advantages of this invention will be more apparent from the following detailed description of certain approved forms of apparatus constructed and operated according to the principles of this invention.

In the accompanying drawings:

Fig. 1 and Fig. 2 are side elevations of a three-car articulated train, Fig. 2 being an extension of the right-hand end of Fig. 1, the central car of the train being broken away and one end thereof being shown at the right of Fig. 1, the other end of this car being shown at the left of Fig. 2.

Fig. 3 is a vertical section showing the motor actuating means and circuit breakers for one of the flow-controlling valves or vanes.

Fig. 4 is a perspective view showing the central portions of the circulation conduits and auxiliary heaters, the enclosing car structure being shown in phantom.

Fig. 5 is a wiring diagram, also showing diagrammatically portions of the temperature conditioning mechanism and circulation conduits.

Figs. 6 and 7 are wiring diagrams showing other positions of the selector-relay controlling mechanism which is shown in normal operating position at the left of Fig. 5.

Referring first to Figs. 1 and 2, the three cars 1, 2 and 3 of the train are articulated together by supporting the adjacent ends of cars 1 and 2 on a single truck indicated generally at 4, and the adjacent ends of cars 2 and 3 on the single truck indicated at 5. The adjacent ends of cars are connected by vestibules so that the space within the train is substantially continuous, and the air circulation conduits hereinafter referred to are connected at the adjacent car ends by flexible sections 6. The forward car 1 has a front compartment 7 in which is located the propelling means, preferably an engine of the internal combustion type. This car 1 also includes an intermediate baggage compartment 8, and a rear compartment 9 in which the auxiliary air heaters and refrigerating apparatus are positioned. Cars 2 and 3 are passenger cars, each of which may contain a single long compartment or may be subdivided as desired.

The air temperature-conditioning system comprises a main heating element A, which also serves as the radiator or heat-dissipating element of the engine cooling system, and the blower B which draws in outside air through the inlet indicated at 10 and forces this air in contact with heating element A and thence into and through the conduit C extending longitudinally through the upper portion of car 1. The blower B is driven by motor 11 actuated by current supplied through the mains 12 and 13. It will be understood that the circuit indicated generally at 12 and 13 is energized whenever the engine is in operation, and is deenergized when the engine is stopped, this circuit being under engine room control and operating independently of the temperature control circuits hereinafter described. The air duct or conduit C is provided with an outlet 14 adjacent its inlet end, and a vane or valve member 15 is adapted to be swung between two alternative positions, in one of which it closes the outlet 14 so that the heated air will be pushed by blower B through the duct C, and in the other position the valve 15 closes the duct C so that the heated air will be forced out through outlet 14 and discharged from the train. The motor-operated actuating mechanism for the valve 15 is illustrated somewhat in detail in Fig. 3, this apparatus being more fully disclosed and claimed in the copending application of Paul B. Parks, William M. Smith and John Van Vulpen, Serial No. 687,118, filed August 28, 1933. The motor 16 rotates, through suitable reduction gearing, the shaft 17 on which is positioned the eccentric 18 which rotates in eccentric-strap 19 connected with one end of a pitman 20 pivoted at its other end to crank-arm 21 secured on the shaft 22 which carries the vane 15. As the eccentric 18 is rotated through 180° from the position shown in Fig. 3 it will, through the link and lever mechanism just described, swing the vane 15 from the solid line position shown in Fig. 3 in which it closes the outlet 14 to the dotted line position in which it closes the duct C. A cam 23 is also mounted on the operating shaft 17, this cam being swung from the downwardly projecting position shown in Fig. 3 through an arc of 180° to a corresponding upwardly projecting position, as the eccentric 18 is rotated through 180° from one of its positions to the other. Upper and lower swinging arms 24 and 25 are pivotally mounted at 26 and 27 respectively, these arms carrying movable contacts 28 and 29 adapted to engage respectively with fixed contacts 30 and 31. A spring 33 connects the two arms 24 and 25 and normally urges these arms toward one another so as to bring the several movable or fixed contacts into engagement. When the cam 23 is swung down to the position shown in Fig. 3 it will engage arm 25 and separate the pair of contacts 29 and 31, at this time the contacts 28 and 30 being held in engagement by the spring 33. Alternatively, when the cam 23 is swung back to its upwardly projecting position, it will engage the arm 24 and separate the contacts 28 and 30, at which time the other pair of contacts 29 and 31 will be held in engagement with one another by spring 33. A pair of alternative actuating circuits for motor 16 extends respectively through the pair of contacts 28, 30 and 29, 31 so that the circuit which has been energizing the motor 16 will be broken by separating one of these pairs of contacts when the valve 15 has been moved to one of its two operative positions. At this time the other motor-actuated circuit will be partially completed through the other pair of circuit breaker contacts so that when this other actuated circuit is completed the motor will again be operated to swing the eccentric 18 and cam 23 through another arc of 180° and move the valve to its other position. The wiring connections for motor 16 and the two circuit breakers are shown in Fig. 5 and will be later described.

An air duct D extends longitudinally through the upper portions of cars 2 and 3, this duct being provided with a plurality of inlet or outlet openings 34 communicating with the compartments within these cars. When the heating system is in operation, air is withdrawn from the car compartments through these openings 34 and drawn into the duct D and thence re-circulated through the heating apparatus as hereinafter described. When the refrigerating system is in operation, cooled air is forced into the duct D and is discharged through openings 34 into the car compartments. The forward end of duct D communicates with a chamber E in which is positioned the refrigerating element F and the blower G for forcing air in contact with the refrigerating element and thence discharging it through duct D into the car compartments. A fresh air inlet 35 communicates with chamber E, this inlet being closed by valve 36 when the heating system is in operation, but being opened when the cooling system is in operation to permit a certain proportion of fresh outside air to be drawn into the circulating air stream.

A conduit having branches H and H' leads from chamber E to a pair of auxiliary heating units J and J' located in compartment 9 at the rear of car 1. Each of these auxiliary heaters comprises a heating element K and K' positioned in the path of the air stream and supplied with heating medium by an oil burner indicated generally at L and L'. Each of these heating elements may be of well known type comprising a motor-operated blower indicated at 37 or 37', the products of combustion passing through the heating elements K or K' and being discharged from the car through the flues 38 or 38'. Each of the auxiliary heating units J and J' also comprises a heating blower M and M' actuated respectively by the motors 39 and 39'. The heated air from unit J is forced out by the blower M through outlet conduit N and thence into the discharge conduit O which extends rearwardly through cars 2 and 3 along one lower side edge portion thereof and is provided with a plurality of outlets 40 for discharging the heated air into the cars. A portion of the heated air stream passes forwardly through a similar conduit P provided with outlets 41 for discharging heated air into the mail room or baggage compartment 8. An exactly similar series of conduits N', O' and P' extends from the other heating unit J' along the opposite lower side portion of the train. A pair of cut-off valves or vanes Q and Q' are located respectively in the inlet portions of the conduits P and P' so as to open these conduits or close the conduits to cut off the flow of heated air therethrough as temperature conditions in the baggage room may require, these valves being motor-actuated by means of the motors 42 and 42' respectively by mechanisms similar to that shown in Fig. 3 and already described. The wiring connections for actuating these valves will be described hereinafter. A pair of booster blowers R and R' are located respectively in the conduits O and O', preferably within the car 2, these booster blowers being actuated by motors 43 and 43' which are wired in parallel with the motors 39 and 39' of the main blowers M and M' so that the booster blowers will operate whenever the main heating blowers are in operation and assist the flow of heated air through the conduits O and O' throughout the length of the two passenger cars 2 and 3.

When the entire heating system is in operation, the flow of the air streams to the several ducts and conduits will be as indicated by the arrows in Fig. 5. The blowers M, M' and R, R' will cause a circulation of air from the space within cars 2 and 3 into the upper conduit D, thence through the chambers J and J' and out through the conduits O and O' from which the air is discharged back into the car compartments through outlets 40. A portion of this air stream may flow out through conduits P and P' and be discharged through outlets 41 into the baggage car. The duct C which carries the engine-heated air discharges through conduits H and H' into the chambers of the auxiliary heaters J and J' so as to be added to the circulating air stream just described. The ducts may be so proportioned, for example, that about seventy-five percent of the air stream will be re-circulated through the conduits D, H and O, and about twenty-five percent fresh air (heated by the engine) is introduced into the air stream through duct C. Under some conditions this engine-heated air is sufficient to maintain the desired temperatures within the car compartments, under which circumstances the auxiliary heating units J and J' do not operate, that is the oil burners are not in operation but the blowers M and R will operate continuously. When the engine heat is insufficient to maintain the desired temperature within the car compartments, the oil burners L and L' are put into operation to furnish heating medium in the heating elements K and K' and supply additional heat to the air stream. The electrical connections for automatically maintaining this temperature control will be hereinbefore described.

Under summer conditions, when the air is to be cooled instead of heated, the auxiliary heating elements J and J' are not in operation and the heating and booster blowers M and R do not operate. At this time the cooling blower G will be in operation to cause a reverse flow of air through conduits O, N, H and D, the air being drawn into conduits O and O' from the car compartments and discharged through the overhead duct D through outlets 34. The refrigerating element F will be operated as required to cool this air stream. At this time the valve 15 will be so positioned as to discharge the heated air from the engine cooling system through the outlet 14, there being no flow of heated air through duct C.

The electrical control system for this temperature-conditioning apparatus will now be described, referring more particularly to Fig. 5. At 44 and 45 are indicated respectively the positive and negative power mains through which current is supplied through the several electrically actuated devices. At T is indicated the main cut-out switch which, when thrown to the dotted line position will render the entire temperature-conditioning system inoperative. When this switch is moved to the solid line position shown in Fig. 5 with the switch arm 46 in engagement with the fixed contact 47, the temperature-conditioning system will be thrown into operation. At U is indicated a manually controlled switch which determines whether the heating or the cooling system shall operate. When in the position shown in solid lines, where the switch will be positioned under "winter" conditions, the heating system will be operative and the cooling system will be inoperative. When the switch is moved to the dotted line position for "summer" conditions, the heating system will be entirely inoperative but the refrigerating system will be operative to cool the air within the cars. We will first assume that the car is being operated under "winter" conditions so that heat is required and that the switches T and U have been moved to the positions shown in solid lines, Fig. 5. At such times current will flow from the positive main 44 through wire 48, main cut-out switch T, wire 49, switch U, fixed contact 50, and wire 51, to the auxiliary positive main 52 from which the several heat-controlling elements now to be described are supplied with current.

Under normal operating conditions, both of the auxiliary heating units J and J' will operate simultaneously, but under certain conditions it is only necessary that one of these units operate, and it is desirable to be able to select which of the two units shall operate at such time so that the other unit may be serviced or repaired. For this purpose the manually operated switch V is provided. When this switch is in the solid line position with switch arm 53 in engagement with fixed contact 54, only the heating unit J will be operative under certain conditions. When switch V is thrown to the dotted line position with switch arm 53 in engagement with fixed contact 55, only the heating unit J' will be operative under these conditions. However, under normal operating conditions, both units J and J' will be operative no matter which position the switch V is moved to, as will be hereinafter apparent.

At W is indicated a selector relay comprising a solenoid coil 56 which is adapted to be energized whenever the engine or other apparatus which propels the train is in operation, and which is de-energized when the engine is not in operation. At 57 is shown a movable switch arm adapted to engage alternatively with one or the other of the fixed contacts 58 and 59, arm 57 normally being held in engagement with fixed contact 58 by means of the spring 60. When the engine mechanism is in operation, current will flow from the positive main 12 of the engine system (or from some other energized portion of the engine-controlling apparatus) through wires 61 and 62, fixed contact 58, switch arm 57, wire 63, solenoid coil 56, and wire 64 to the negative main 45. The core 65 of the relay supports, through stem 66, a plurality of contact plates 68, 69 and 70. When the coil 56 is energized (the normal condition) the contact plate 68 will be lifted into engagement with a pair of fixed contacts 71 and 72. When the relay is de-energized, the core 65 will drop so as to bring contact plate 69 into engagement with a pair of fixed contacts 73 and 74, and bring contact plate 70 into engagement with a pair of fixed contacts 75 and 76. At the same time contact plate 68 will be moved out of engagement with the fixed contacts 71 and 72.

With the control switches T and U in the positions shown in solid lines, the actuating motor 39 for heating-blower M will be energized through the following circuit: From positive main 52 through wire 77, motor 39, wire 78, fuse 211 and wire 79, fixed contacts 54 and switch arm 53 of switch V, and wire 80 to the negative main 45. At the same time the motor 39' of the other heating blower M' will be energized through the following circuit: From positive main 52, through wire 77, motor 39', wire 81, fuse 212 and wire 82 to fixed contact 72 of the selector switch W, contact plate 68, fixed contact 71, and wire 83 to the switch V and thence as before through the wire 80 to negative main 45. It will be observed that when the selector relay W is de-energized, this last mentioned circuit will be broken so as to stop the blower M', but the blower M will continue to operate. If the switch V is thrown to the dotted line position, the motor 39' of blower M' will be energized directly through a circuit extending from positive main 52 through wire 77, motor 39', and wire 81, fuse 212 and wire 84 to the fixed contact 55 of switch V and thence through wire 80 to the negative main 45. Under these conditions the other heating blower M will be energized through a circuit extending from positive main 52 through wire 77, motor 39, wire 78, fuse 211 and wire 83 to selector switch W and thence through wires 82 and 84 back to the switch V and through wire 80 to the negative main 45. Under these conditions when selector relay W is de-energized, the blower M' will continue to operate but the blower M will be thrown out of operation.

It will be noted that the motor 43 of booster blower R is connected in parallel with the motor 39 of main heating blower M through the wire 85 extending from positive main 52, motor 43, and wire 86 to the wire 78. In an exactly similar manner the other booster motor 43' is connected in parallel with the motor 39' of blower M' through the wire 85, motor 43' and wire 87 leading to the wire 81. Therefore, these booster blowers will operate whenever the main blowers are in operation and will cease to operate simultaneously therewith.

At X is indicated a relay for controlling the flow through duct C of air heated by the engine. The coil 88 of this relay is normally energized by current flowing from positive main 52 through wire 89, resistance 90, wire 91, mercury-tube thermostat 92, wire 93, coil 88, resistance 94 and wire 95 to the negative main 45. The thermostat 92 is positioned in the duct C, and the mercury column of this thermostat will normally maintain connection between the two fixed contacts to which the wires 91 and 93 are attached unless the temperature of the air stream flowing through duct C falls below some predetermined minimum, for example, 74° F. So long as the relay coil 88 is energized it will lift the core of this solenoid so as to hold the movable contact plate 96 in engagement with a pair of fixed contacts 97 and 98. When the coil 88 is de-energized, the core will drop so as to bring contact plate 96 into engagement with another pair of fixed contacts 99 and 100. Another mercury-tube thermostat 101 is positioned at a suitable location in one of the passenger cars, preferably in the rear car 3. A shunt circuit adapted to de-energize the coil 88 of relay X extends through wires 93 and 102 through a fixed contact 103 with which the mercury column of thermostat 101 is in constant engagement. A second fixed contact 104 in this thermostat is so positioned that the mercury column will engage therewith when a certain predetermined temperature, for example 74° F., is reached in the passenger compartment. The fixed contact 104 is connected through wire 105 with the other side of relay coil 88. It will thus be seen that when this predetermined maximum temperature is reached in the passenger compartment, a shunt circuit will be completed de-energizing the solenoid coil 88 so as to permit the contact plate 96 to fall and complete a circuit between fixed contacts 99 and 100. Current will then flow from the positive main 44 through wire 106, fixed contact 99, movable contact plate 96, fixed contact 100, wire 107, fixed and movable contacts 30 and 28, and swinging arm 24 of the circuit breaker already described, thence through valve-operating motor 16 and wire 108 to the negative main 45. The motor 16 will now be energized to rotate the eccentric 18 and cam 23 (see Fig. 3) and swing the vane 15 to its dotted line position so as to stop the flow of heated air from the engine through duct C and divert this heated air through the outlet 14. When the temperature in the passenger compartment falls below the predetermined temperature, the shunt circuit through thermostat 101 will be broken so that the relay X will again be energized to lift the contact plate 96 into engagement with the fixed contacts 97 and 98. At the completion of the valve operating movement just described, the cam 23 will have operated to separate the contacts 28 and 30 and stop the motor 16, but the contacts 29 and 31 of the other circuit breaker will have been moved into engagement with one another by the spring 33 (see Fig. 3). Another operating circuit will now be completed from positive main 44 through wire 106, contacts 97, 96 and 98 of relay X, wire 109, circuit breaker contacts 29 and 31 and swinging arm 25, motor 16 and wire 108 to the negative main 45. The energized motor 16 will now rotate until the valve 15 has again been swung to the solid line position shown in Fig. 3 so as to close the outlet 14 and once more permit the heated air to flow through duct C into the circulating air stream. It will now be noted that whenever the temperature of the air stream flowing through duct C falls below a predetermined minimum, the energizing circuit for relay coil 88 will be broken through the thermostat 92 so that the valve 15 will be moved to divert the engine cooling air through outlet 14. This will prevent the drawing of cold or insufficiently heated air into the circulating air stream through duct C.

A pair of similar thermostatic control mechanisms Y and Y' are positioned at opposite sides of the mail or baggage compartment 8 to control the flow of heated air through conduits P and P' into this compartment. The mechanism Y comprises a plurality of similar mercury tube thermostats 110, 111 and 112 which may be designated respectively the "high", "medium" and "low" thermostats. Each of these thermostats is provided with a lower fixed contact in constant engagement with the mercury column and an upper fixed contact so positioned that the mercury column will engage therewith at a certain predetermined temperature so as to complete a circuit through the thermostat. For example the high temperature thermostat 110 may complete its circuit at 72° F., the medium temperature thermostat 111 at 70° F. and the low temperature thermostat 112 at a certain minimum temperature below which the temperature in the car should not be permitted to fall, for example, 60° F. The mechanism Y also comprises a manually adjustable contact arm 113 which is in constant engagement at one end with an arcuate contact plate 114, and which is adapted to have its lower end swung into engagement with any one of a plurality of fixed contacts 115, 116 or 117. The cooperating relay, indicated generally at 118, is in all respects similar to the relay X previously described, the coil 119 of this relay being normally energized through the following circuit: From positive main 52, through wire 120, resistance 121, coil 119, resistance 122, and wire 123 to the negative main 45. When the relay is energized, the movable contact plate 124 will be lifted so as to bridge the pair of fixed contacts 125 and 126. When the relay is de-energized the contact plate 124 will fall so as to bridge the other pair of fixed contacts 127 and 128. The motor 42 which operates the valve or vane Q in conduit P is provided with a pair of circuit breakers 129 and 130 which operate in the same manner as the circuit breakers already described associated with the motor 16. When relay 118 is energized an operating circuit for motor 42 which will cause the valve Q to be moved to its open position is completed as follows: From positive main 44 through wire 131, relay contacts 125, 124 and 126, wire 132, circuit breaker 130, motor 42, and wire 133 to the negative main 45. At the completion of this valve-opening movement the circuit will be broken by the separation of the contacts of circuit breaker 130. When the relay 118 is de-energized, a second motor actuating circuit will be completed as follows: From positive main 44 through wire 131, relay contacts 127, 124 and 128, wire 134, circuit breaker 129, motor 42 and wire 133 to the negative main. The valve will now be closed and at the completion of this movement the circuit just described will be broken by opening the circuit breaker 129.

One terminal of relay coil 119 is connected through wire 135 with the lower fixed contacts of the three thermostats 110, 111 and 112. The upper fixed contact of high temperature thermostat 110 is connected through wires 136 and 137 with the other terminal of relay coil 119. It will be noted that wire 137 also leads to the arcuate contact plate 114, but when adjustable contact arm 113 is moved to the high-temperature position in engagement with contact 115, no other circuits will be completed through these contact members. The medium and low temperature thermostats 111 and 112 will therefore be ineffective. Now if the temperature at that side of the baggage compartment 8 where the thermostatic mechanism Y is positioned rises to the predetermined high temperature, for example, 72° F., the shunt circuit around relay coil 119 just described will be completed through the thermostat 110 and the relay will be de-energized so as to permit the contact plate 124 to fall and complete the circuit for closing the valve Q, thus cutting off the further flow of heated air through conduit P into the compartment 8. When the temperature at this side of the compartment falls so as to break the circuit through thermostat 110, relay coil 119 will again be energized so as to lift the contact plate 124 and complete the other motor circuit so that valve Q will again be opened to permit heated air to flow through conduit P into the compartment.

If the manually adjustable contact arm 113 is moved to the intermediate position shown in Fig. 5, the medium temperature thermostat 111 will be placed in control of the relay and valve. When the mercury column of this thermostat rises so as to contact with the upper fixed contact of the thermostat (for example at 70° F.) a shunt circuit will be completed between the terminals of relay coil 119 as follows: Through wire 135, thermostat 111, wire 138, fixed contact 116, contact arm 113, arcuate contact plate 114, and wire 137 to the other terminal of the relay coil. It will be apparent that this circuit through the medium temperature thermostat 111 will always be completed before the temperature can rise so as to complete a circuit through high temperature thermostat 110 so that the high temperature thermostat will be ineffective and the flow of heated air through conduit P will always be cut off as soon as the temperature within the compartment rises to the predetermined medium temperature. In an exactly similar manner, when the switch arm 113 is moved to the "low" position a shunt circuit will be completed through the lower temperature thermostat 112 as follows: Through wire 135, low temperature thermostat 112, wire 139, fixed contact 117, switch arm 113, contact plate 114, and wire 137 to the other terminal of the relay coil. Under these conditions the temperature will not be permitted to rise above the temperature for which the "low" thermostat 112 is adjusted.

The other thermostatic mechanism Y' and its cooperating relay indicated generally at 140 are electrically connected and operate in exactly the same manner as the mechanism Y and relay 118 just described so as to control in a similar manner the valve Q' in the conduit P' at the other side of the car. It will be apparent that the mechanisms Y and Y' may be independently adjusted to maintain a higher temperature or supply more heated air to one side of the car than to the other if prevailing temperature conditions makes this adjustment desirable.

The pair of similar thermostatic mechanisms Z and Z' are positioned at suitable locations at opposite sides of one of the passenger-carrying cars, preferably the rear car 3. These thermostatic mechanisms are adapted to control, through the relays 141 and 142 respectively, the motors 37 and 37' of the two oil burners L and L'. These thermostatic mechanisms Z and Z' may be in all respects the same (except for the additional wiring connections with the low temperature thermostat as hereinafter described) as the thermostatic mechanism Y hereinabove described. The relays 141 and 142 are also energized and operate in the same manner as the relays X and 118 already described in detail. When relay 141 is energized, it will lift the contact plate 143 so as to bridge the pair of fixed contacts 144 and 145. When the relay is deenergized, the contact plate 143 will be lowered so as to break the connection between contacts 144 and 145, but no other circuit will be completed. When relay 141 is energized and the contact plate 143 is lifted, the motor 37 of oil burner L will be energized through the following circuit: From positive main 52 through wire 146, relay contacts 144, 143 and 145, wire 147, motor 37, wires 148 and 78, fuse 211 and wire 79 to switch V, and thence through wire 80 to the negative main 45. When switch V is moved to the dotted line position, this energizing circuit will extend from wire 148 through wire 78, fuse 211, wires 79 and 83, the contacts 71, 68 and 72 of selector switch W, and wire 82 to the switch V and thence through wire 80 to the negative main.

When the relay 142 is energized, the movable contact plate 149 will be lifted to connect the pair of fixed contacts 150 and 151. An energizing circuit for the other oil burner motor 37' will now be completed as follows: From positive main 52 through wire 152, relay contacts 150, 149 and 151, wire 153, motor 37', wire 154, fuse 212 and wire 82, contacts 72, 68 and 71 of selector relay W, wires 83 and 79 to the switch V, and thence through wire 80 to the negative main 45. When switch V is moved to the dotted line position, this circuit will be completed from motor 37' through wire 154, fuse 212 and wire 84 to the switch V and thence through wire 80 to the negative main. It will be noted that, as was the case with the blowers M and M', the oil burners L and L' will both be operative as long as the selector relay W is energized, but when this relay is deenergized only one of the oil burners will be operative, depending upon the positioning of the switch V.

Whenever the thermostat of the mechanisms Z or Z' which has been placed in control completes a shunt circuit about the relay 141 or 142, the respective oil burner L or L' will be temporarily thrown out of service. When the temperature falls so as to break the shunt circuit through this thermostat, the relay 141 or 142 as the case may be will again be energized and the oil burner will again be placed in operation so as to supply the additional heat to the circulating air stream.

A thermostat 155 is positioned in the duct or conduit N through which heated air is discharged from the heater J. The fixed contacts of this thermostat are so spaced that the circuit therethrough will be normally open but will be closed at some predetermined maximum temperature, for example 120° Fahrenheit. When this maximum temperature is reached, a shunt circuit which will deenergize the relay 141 and stop the oil burner L will be completed through wire 156, thermostat 155 and wire 157. This provides a safety means for preventing the heated air discharged through conduit N from reaching an excessive temperature. In a similar manner, a shunt circuit for deenergizing the other relay 142 and stopping the oil burner L' may be completed through wires 158 and 159 and a thermostat 155' positioned in the other outlet conduit N'.

When the train is out of service and the engine is not in operation, it is usually unnecessary to maintain the higher temperatures in the passenger compartments but it is desirable to maintain a predetermined low temperature in these cars, that is the temperature should not be allowed to fall below a predetermined minimum. This may conveniently be the temperature for which the low temperature thermostats 160 and 160' of the mechanisms Z and Z' are adjusted. When the engine mechanism is not in operation, and the selector relay W is deenergized, an operating circuit for deenergizing the relay 141 will be completed through low temperature thermostat 160 as follows: From one terminal of the coil of relay 141 through wire 161, low temperature thermostat 160, wire 162, contacts 73, 69 and 74 of selector relay W, and wires 163, 164 and 165 to the other terminal of the relay. This will make the low temperature thermostat 160 effective to control the oil burner mechanism L even though the thermostatic mechanism Z has been adjusted for either the medium or high temperatures. Consequently the heating mechanism will be thrown out of service as soon as this predetermined low temperature has been reached in the car compartment, but the heating apparatus will again be thrown into service when the temperature falls below this predetermined low temperature so as not to let the temperature within the car fall below this predetermined minimum. In an exactly similar manner the thermostat 160' of the thermostatic mechanism Z' is adapted to control the relay 142 and burner mechanism L' through a shunt circuit extending through the coil of relay 142 through wires 166 and 167, thermostat 160', wire 168, contacts 75, 70 and 76 of selector relay W, and wires 169 and 170 to the other terminal of relay coil 142.

Under some conditions it may be desirable to maintain higher temperatures within the passenger compartments when the train is out of service, or for some other reason the engine mechanism is inoperative. Therefore supplementary means is provided for energizing the selector relay W so as to break the low-temperature control circuit last described and permit a normal operation of the heating apparatus within the passenger compartments. The mechanism for permitting this operation is shown in normal position at S in the upper left portion of Fig. 5, and is shown in other operating positions in Figs. 6 and 7. The manually operable plunger 171 is slidably mounted in the fixed frame 172 and will normally be positioned as shown in Figs. 5 and 6. A latch or locking plunger 173 is normally held in its elevated inoperative position as shown in Fig. 5 by the coil 174 which is energized through a circuit extending from the positive side of the engine operating circuit through wire 61, wire 175, coil 174, and wire 176 to the negative main 45. When the engine circuit is broken, this coil 174 will be deenergized so as to permit the latch or plunger 173 to drop into engagement with the operating plunger 171, all as shown in Fig. 6. If now it is desirable to maintain a temperature higher than the predetermined minimum within the passenger compartments, the plunger 171 is pushed in so as to swing the movable switch arm 57 out of engagement with fixed contact 58 and into engagement with the fixed contact 59. The latch member 173 will now drop into the annular groove, or other recess 177 formed in plunger 171 so as to hold the parts in this position, all as shown in Fig. 7. A supplementary energizing circuit for relay coil 65 will now be completed, independently of the engine-operating circuits, as follows: From positive main 44 through wire 178, fixed contact 59, movable switch arm 57, wire 63, solenoid coil 56, and wire 64 to the negative main 45. The selector relay W will then be energized so as to hold the several movable contact plates in the normal position as shown in Fig. 5. This will permit both of the auxiliary heating mechanisms J and J' to operate and will also permit the thermostatic mechanisms Z and Z' to maintain either the medium or high temperatures within the passenger car compartments. As soon as the engine operating circuits are again completed, the coil 174 will again be energized to lift the plunger 173 thus disengaging the operating plunger 171 and permitting the spring 60 to swing switch arm 57 back to its normal position in engagement with fixed contact 58, also pushing out the plunger 171 to the normal position shown in Figs. 5 and 6. The parts are now all returned to their normal positions so that when the engine is again stopped, only the predetermined minimum temperature will be maintained within the car compartment unless the manually operable plunger 171 is again pushed in.

Under "summer" operating conditions, the switch U will be swung to the dotted line position. This will render all of the heat-controlling thermostatic mechanisms inoperative since the connection through which current is supplied to the auxiliary positive main 52 will be broken. The valve 15 will be moved so as to close the duct C and discharge the heated air from the engine cooling system through outlet 14, and the valves Q and Q' will be closed to close the conduits P and P' leading to the baggage car. Assuming that the main switch T is closed (that is in the positon shown in solid lines in Fig. 5), an operating circuit for the cooling blower G will now be completed as follows: From positive main 44 through wire 48, switch T, wire 49, switch U, wires 179 and 180 to the motor 181 of the cooling blower G, and wire 182 to the negative main 45. This cooling blower will operate continuously to cause a reversed circulation of air through the conduits O and O', N and N', cooling chamber E and upper duct D, the cooled air being discharged through outlets 34 into the upper portion of the passenger compartments.

The refrigerating means F is controlled from the thermostatic mechanism AA through the relay assembly indicated generally at BB. Similarly to the other thermostatic mechanisms previously described this thermostatic assembly AA may comprise a plurality of mercury tube thermostats 183, 184 and 185 adapted to respectively maintain relatively high, medium and low temperatures within the cars. The adjustable contact arm 186 engages at one end with the arcuate contact plate 187 and is adapted to be engaged at its other end alternatively with the three fixed contacts 188, 189 and 190 to respectively place the high, medium and low temperature thermostats in control. The contact arm 186 may also be moved into engagement with a fixed contact 191 and when in this position the refrigerating mechanism F will be continuously in operation regardless of the temperatures registered by the thermostats. Assuming that the mechanism AA is adjusted as shown so that the low temperature thermostat 185 is in control, and assuming that the temperature within the car has risen above the temperature for which this thermostat is adjusted, a control circuit will be completed as follows: From the positive main 44 through wire 48 and switches T and U, wires 179 and 192, resistance 193, wire 194, arcuate contact plate 187, contact arm 186, fixed contact 190, wire 195, thermostat 185, wire 196, relay coil 197, and wire 198 to the negative main 45. This will energize the relay 197 so as to raise the movable contact plate 199 into engagement with the fixed contact 200 thus completing an energizing circuit through a second relay coil 201 as follows: From positive main 44 through wire 202, relay coil 201, wire 203, movable contact 199, fixed contact 200, and wire 198 to the negative main 45. The energized relay coil 201 will elevate a pair of movable contact plates 204 and 205 respectively into engagement with two pairs of fixed contact members so as to complete an energizing circuit for the refrigerating element F as follows: From positive main 44 through wire 202, wire 206, contact plate 204, wire 207 to the motor 208 which actuates the refrigerating element F, wire 209, movable contact plate 205, and wire 210 to the negative main 45. As soon as the temperature within the car compartment has been lowered below the maximum temperature for which thermostat 185 is adjusted, the first named control circuit will be broken so as to successively deenergize the relays 197 and 201 and thus break the main circuit of motor 208 so that the refrigerating element F will be temporarily put out of service. The thermostats 184 and 183 operate in exactly a similar manner but will permit the temperature within the car to rise somewhat higher to a predetermined minimum or high temperature respectively. When the movable contact arm 186 is moved to the "full on" position in engagement with fixed contact 191, the energizing circuit for relay 197 will be continuously completed regardless of the temperatures registered by the several thermostats. When so adjusted the refrigerating element F will operate continuously.

In the general operation of this system, the "change-over" switch U will first be adjusted to accord with seasonal conditions, that is for summer or winter use, or this switch may be adjusted when enroute if necessary, if the train travels from one climate into another. The entire system may then be thrown into or out of operation as desired by throwing on or off the main switch T. When heat is required, the switch U will be in the position shown in solid lines in Fig. 5. The several thermostatic mechanisms Y, Y', Z and Z' will be adjusted in accordance with the heat desired in the several train compartments. When the engine is in operation, the heated air from the engine cooling system will be delivered into the car re-circulating air stream and as long as this heat furnished from the engine is sufficient to satisfy the requirements the auxiliary heaters L and L' will not operate. Whenever this engine heat is insufficient to meet the requirements, these auxiliary heaters will be thrown into operation at such intervals as is necessary to maintain the desired temperatures within the train. Whenever the temperature of the air stream from the engine falls below a predetermined minimum, this air stream will be cut off so as not to unduly lower the temperature within the train. This engine-heated air stream will also be cut-out of the circulating system whenever the temperature within the train rises above a desired maximum. When the train is out of service and the engine is not in operation, the temperature within the passenger compartments will be permitted to drop to a predetermined minimum, but will not be permitted to fall below this minimum so that the train compartments will not be unduly chilled. By manual manipulation of the push-button or plunger 171, the train may be maintained at any desired higher temperature even when the engine is not operating, but the system will be returned to the normal automatic control as soon as the engine is again started.

When the engine is not in operation and the cars are being maintained at the minimum temperature, only one of the auxiliary heating mechanisms L or L' will be required and the other auxiliary heating mechanism is automatically cut out of service. By moving the control switch V to either of its alternative positions, the heating device L or L' which is to remain in service can be selected as desired. This will permit servicing of one of these heating units while the other one remains active.

Under summer conditions, it is merely necessary to reverse the position of switch U whereupon the direction of air circulation within the cars will be automatically reversed and the refrigerating system will be thrown into operation, the temperature to be maintained being automatically controlled by the thermostatic mechanism AA which can be adjusted to either maintain a certain predetermined temperature, or to permit a continuous operation of the refrigerating apparatus.

It will be noted that fuses 211 and 212 are positioned in the circuit wires 78 and 81 respectively. The energizing circuits for heating blower motor 39 and oil burner motor 37 both pass through fuse 211, and correspondingly the fuse 212 is in the energizing circuits for the blower motor 39' and the oil burner motor 37'. As a result, if the blower fan (of either pair) should fail to operate properly and blow the fuse in the fan circuit, the corresponding oil-burner will be shut down thus preventing the damage that might occur to the heating unit if the burner should continue to operate while the fan was not in operation.

We claim:

1. In a heating system, in combination, a chamber having an air inlet, a heating element positioned in the chamber, a duct for heated air leading from the chamber into a space to be heated, a blower for causing air to flow through the chamber in contact with the heating element and forcing the air through the duct, an auxiliary air outlet adjacent the inlet end of the duct, a valve means for alternatively closing the outlet or the duct so that the heated air will be forced either through the outlet or through the duct into the space to be heated, motor means for selectively causing the valve to be moved to its alternate positions, and a thermostat positioned in the duct and operative when the temperature of the air therein falls below a predetermined minimum to cause the valve to be moved to direct the air from the chamber through the auxiliary outlet.

2. In a heating system, in combination, a chamber having an air inlet, a heating element positioned in the chamber, a duct for heated air leading from the chamber, a blower for causing air to flow through the chamber in contact with the heating element and forcing the air through the duct, an auxiliary air outlet adjacent the inlet end of the duct, a valve means for alternatively closing the outlet or the duct so that the heated air will be forced either through the outlet or the duct, motor means for selectively causing the valve to be moved to its alternate positions, a space into which the duct discharges the heated air, and a thermostat positioned in said space and operative when a predetermined maximum temperature is reached within the space to cause the valve to be moved to direct the air from the chamber through the auxiliary outlet.

3. In a heating system, in combination, a chamber having an air inlet, a heating element positioned in the chamber, a duct for heated air leading from the chamber, a blower for causing air to flow through the chamber in contact with the heating element and forcing the air through the duct, an auxiliary air outlet adjacent the inlet end of the duct, a valve means for alternatively closing the outlet or the duct so that the heated air will be forced either through the outlet or the duct, motor means for selectively causing the valve to be moved to its alternate positions, a space into which the duct discharges the heated air, a thermostat positioned in said space and a second thermostat positioned in the duct, said thermostats controlling the motor means so that the heated air from the chamber will be directed through the duct into the space as long as the temperature of the air in the duct is above a predetermined minimum and the temperature within the space is below a predetermined maximum, but the air will be directed through the auxiliary outlet when either the temperature within the duct falls below the predetermined minimum or the temperature in the space rises above the predetermined maximum.

4. In a heating system in combination with a space to be heated, an air circulation passage having inlets leading from the space and outlets leading into the space, a blower for forcing air through the passage, a duct leading into the passage, a heating element, means for drawing air from outside the space and forcing this air in contact with the heating element and through the duct into the passage, an auxiliary heating element in the passage, a heater for supplying heating medium to the auxiliary heating element, and thermostatic mechanism positioned within the space and responsive to temperature changes therein for controlling the operation of the heater.

5. In a heating system in combination with a space to be heated, an air circulation passage having inlets leading from the space and outlets leading into the space, a blower for forcing air through the passage, a duct leading into the passage, a heating element, means for drawing air from outside the space and forcing this air in contact with the heating element and through the duct into the passage, an auxiliary heating element in the passage, a heater for supplying heating medium to the auxiliary heating element, and thermostatic mechanism positioned within the space and responsive to temperature changes therein for controlling the operation of the heater, and for cutting off the flow of heated air through the duct when a predetermined maximum temperature is reached within the space.

6. In a heating system in combination with a space to be heated, an air circulation passage having inlets leading from the space and outlets leading into the space, a blower for forcing air through the passage, a duct leading into the passage, a heating element, means for drawing air from outside the space and forcing this air in contact with the heating element and through the duct into the passage, an auxiliary heating element in the passage, a heater for applying heating medium to the auxiliary heating element, thermostatic mechanism positioned within the space and responsive to temperature changes therein for controlling the operation of the heater, and means comprising a thermostat positioned within the space and operative at a predetermined maximum temperature within the space for cutting off the flow of heated air through the duct.

7. In a heating system in combination with a space to be heated, an air circulation passage having inlets leading from the space and outlets leading into the space, a blower for forcing air through the passage, a duct leading into the passage, a heating element, means for drawing air from outside the space and forcing this air in contact with the heating element and through the duct into the passage, an auxiliary heating element in the passage, a heater for supplying heating medium to the auxiliary heating element, thermostatic mechanism positioned within the space and responsive to temperature changes therein for controlling the operation of the heater, and means comprising a thermostat positioned within the passage between the auxiliary heating element and the outlets for rendering the heater ineffective when a predetermined maximum temperature is attained within the passage.

8. In a heating system in combination with a space to be heated, an air circulation passage having inlets leading from the space and outlets leading into the space, a blower for forcing air through the passage, a heating element within the passage, a heater for supplying heating medium to the heating element, thermostatic mechanism positioned within the space and responsive to temperature changes therein for controlling the operation of the heater, and a thermostat positioned within the passage between the heating element and the outlets for rendering the heater ineffective when a predetermined maximum temperature is attained within the passage.

9. In a heating system, a supply duct for heated air, a heating element, means for forcing air through the duct in contact with the heating element, a plurality of branch conduits leading separately from the duct into spaces to be heated, a valve means in each branch conduit for opening or closing the conduit, motor means for operating each valve, and separate thermostatic mechanisms positioned in the respective spaces and responsive to selected temperature changes in these spaces for independently controlling the several motor means.

10. In a heating system, an apparatus for supplying heating medium, an electric operating circuit for this apparatus, an electrically actuated thermostatic control mechanism in the space to be heated operative to control the heating apparatus to maintain any one of a plurality of selected temperatures in this space, and a selector relay electrically connected with the first mentioned operating circuit and functioning when said operating circuit is broken to cause the control mechanism to maintain only a predetermined minimum temperature in the space.

11. In a heating system, an apparatus for supplying heating medium, an electric operating circuit for this apparatus, an electrically actuated thermostatic control mechanism in the space to be heated operative to control the heating apparatus to maintain any one of a plurality of selected temperatures in this space, a selector relay electrically connected with the first mentioned operating circuit and functioning when said operating circuit is broken to cause the control mechanism to maintain only a predetermined minimum temperature in the space, and a manually operable control switch connected in circuit with the relay for positioning the relay to permit higher temperatures to be maintained when the first mentioned operating circuit is broken.

12. In a heating system, an apparatus for supplying heating medium, an electric operating circuit for this apparatus, a pair of auxiliary devices for simultaneously supplying additional heating medium, and a selector relay electrically connected with the operating circuit and functioning when this circuit is broken to prevent the operation of one of the auxiliary heating devices.

13. In a heating system, an apparatus for supplying heating medium, an electric operating circuit for this apparatus, a pair of auxiliary devices for simultaneously supplying additional heating medium, a selector relay electrically connected with the operating circuit and functioning when this circuit is broken to prevent the operation of one of the auxiliary heating devices, and a manually operative switch to determine which one of the auxiliary heating devices shall remain operative when the first mentioned heating apparatus is inoperative.

14. In a heating system, an apparatus for supplying heating medium, an electric operating circuit for this apparatus, a pair of auxiliary devices for simultaneously supplying additional heating medium, an electrically actuated thermostatic control mechanism in the space to be heated operative to control the auxiliary heating devices to maintain any one of a plurality of predetermined temperatures in the space, and a selector relay electrically connected with the first mentioned operating circuit and functioning when this circuit is broken to permit only one of the auxiliary heating devices to operate and to cause the control mechanism to maintain only a predetermined low temperature in the space to be heated.

15. In a heating system, an apparatus for supplying heating medium, an electric operating circuit for this apparatus, a pair of auxiliary devices for simultaneously supplying additional heating medium, an electrically actuated thermostatic control mechanism in the space to be heated operative to control the heating devices to maintain any one of a plurality of predetermined temperatures in the space, a selector relay electrically connected with the first mentioned operating circuit and functioning when this circuit is broken to permit only one of the auxiliary heating devices to operate and to cause the control mechanism to maintain only a predetermined low temperature in the space to be heated and a manually operative switch to determine which one of the auxiliary heating devices shall remain operative when the first mentioned heating apparatus is inoperative.

16. In a heating system, in combination with temperature conditioning apparatus, an electric actuating circuit for a portion of this apparatus, an electrically actuated temperature control system including a plurality of control circuits, and an automatic selector mechanism comprising a relay including an actuating coil, a plurality of pairs of spaced contacts, each pair being included in one of the control circuits, and means moved by the coil to connect or disconnect certain of the contacts when the coil is energized or de-energized and an energizing circuit for the relay coil connected with the first mentioned actuating circuit so that the coil-energizing circuit will be completed and the coil will be energized when the actuating ciruit is closed and will be de-energized when the actuating circuit is broken.

17. In a heating system, in combination with temperature conditioning apparatus, an electric actuating circuit for a portion of this apparatus, an electrically actuated temperature control system including a plurality of control circuits, and an automatic selector mechanism comprising a relay including an actuating coil, a plurality of pairs of spaced contacts, each pair being included in one of the control circuits, means moved by the coil to connect or disconnect certain of the contacts when the coil is energized or de-energized, an energizing circuit for the relay coil connected with the first mentioned actuating circuit so that the coil-energizing circuit will be completed and the coil will be energized when the actuating circuit is closed and will be de-energized when the actuating circuit is broken, an auxiliary energizing circuit for the relay coil, a switch member included in both coil-energizing circuits and movable to two alternative positions for selectively completing either energizing circuit, means for normally holding the switch member in the position for completing the first mentioned coil-energizing circuit, and a manually operable member for moving the switch member to complete the auxiliary energizing circuit.

18. In a heating system, in combination with temperature conditioning apparatus, an electric actuating circuit for a portion of this apparatus, an electrically actuated temperature control system including a plurality of control circuits, and an automatic selector mechanism comprising a relay including an actuating coil, a plurality of pairs of spaced contacts, each pair being included in one of the control circuits, means moved by the coil to connect or disconnect certain of the contacts when the coil is energized or de-energized, an energizing circuit for the relay coil connected with the first mentioned actuating circuit so that the coil-energizing circuit will be completed and the coil will be energized when the actuating circuit is closed and will be de-energized when the actuating circuit is broken, an auxiliary energizing circuit for the relay coil, a switch member included in both coil-energizing circuits and movable to two alternative positions for selectively completing either energizing circuit, means for normally holding the switch member in the position for completing the first mentioned coil-energizing circuit, a manually operable member for moving the switch member to complete the auxiliary energizing circuit, a latch for holding the switch in the last mentioned position, and electrically actuated means for releasing the latch when the first mentioned actuating circuit is completed.

19. In a heating system, in combination with a space to be heated, a main source of heat, means for transmitting heat from the source to the air within the space, an auxiliary heating means, means for transmitting heat from this means to the air within the space, and thermostatically controlled mechanism responsive to temperature changes within the space for rendering the auxiliary heating means respectively operative or inoperative as the temperature within the space falls below or rises above a predetermined selected temperature and for stopping the transmission of heat to the space from the main source when the temperature within the space rises above a predetermined maximum.

20. In a heating system, in combination with a space to be heated, a main source of heat, means for passing air in contact with this source and introducing this heated air into the space, an auxiliary means for heating the air within the space, and thermostatically controlled mechanism responsive to temperature changes within the space for rendering the auxiliary heating means respectively operative or inoperative as the temperature within the space falls below or rises above a predetermined selected temperature, and for diverting from the space the flow of heated air from the main source when the temperature within the space rises above a predetermined maximum.

21. In a heating system, in combination with a space to be heated, means for circulating a stream of air from and back into the space, a main source of heat, means for passing air in contact with this source and introducing this heated air into the circulating air stream, an auxiliary means for heating the air stream, and thermostatically controlled mechanism responsive to temperature changes within the space for rendering the auxiliary heating means respectively operative or inoperative as the temperature within the space falls below or rises above a predetermined selected temperature, and for cutting off the flow of heated air from the main source into the air stream when the temperature within the space rises above a predetermined maximum.

22. In combination with a space to be heated, a source of heat, means for blowing a stream of air in contact with this source to remove heat therefrom, means for alternatively directing this heated air stream into the space or the outer air, an auxiliary means for heating the air within the space, and thermostatically controlled mechanism responsive to temperature changes within the space for rendering the auxiliary heating means respectively operative or inoperative as the temperature within the space falls below or rises above a predetermined selected temperature, and for diverting the heated air stream away from the space when the temperature within the space rises above a predetermined maximum.

JOHN VAN VULPEN.
EDWARD A. RUSSELL